US012709101B2

(12) United States Patent
Ito

(10) Patent No.: US 12,709,101 B2
(45) Date of Patent: Aug. 18, 2026

(54) DROPLET EJECTING APPARATUS, REMOVER DETERIORATION DETERMINING METHOD FOR DROPLET EJECTING APPARATUS, AND STORAGE MEDIUM

(71) Applicant: Konica Minolta, Inc., Tokyo (JP)

(72) Inventor: Yohei Ito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 224 days.

(21) Appl. No.: 18/653,587

(22) Filed: May 2, 2024

(65) Prior Publication Data

US 2024/0375403 A1 Nov. 14, 2024

(30) Foreign Application Priority Data

May 12, 2023 (JP) ................................ 2023-078953

(51) Int. Cl.
*B41J 2/175* (2006.01)

(52) U.S. Cl.
CPC ....... *B41J 2/17563* (2013.01); *B41J 2/17566* (2013.01); *B41J 2/17596* (2013.01); *B41J 2002/17576* (2013.01)

(58) Field of Classification Search
CPC .... B41J 2/175; B41J 2/17563; B41J 2/17566; B41J 2/17546; B41J 2/17596; B41J 2002/17576; B41J 2/18; B41J 2/19; B41J 29/38
See application file for complete search history.

(56) References Cited

U.S. PATENT DOCUMENTS

2010/0085396 A1* 4/2010 Yokota ................. B41J 2/14233 347/17
2017/0087864 A1* 3/2017 Akishiba .............. B41J 2/17596
2017/0259574 A1* 9/2017 Fujioka ................ B41J 2/16508
2020/0230971 A1* 7/2020 Nishizawa ............... B41J 29/38

FOREIGN PATENT DOCUMENTS

JP 2003-011380 A 1/2003

* cited by examiner

*Primary Examiner* — Anh T Vo
(74) *Attorney, Agent, or Firm* — LUCAS & MERCANTI, LLP

(57) ABSTRACT

Disclosed is a droplet ejecting apparatus including: a liquid feed pump that is provided in a liquid channel between a liquid storage to store liquid and a droplet ejector to eject liquid, and feeds out the liquid in the liquid storage to the droplet ejector; a remover that is located in the liquid channel and removes a foreign substance in liquid; and a hardware processor that: sets, using a pressure generator, a pressure on an upstream side in a liquid feeding direction of the remover to be higher than a pressure on a downstream side in the liquid feeding direction; acquires, from a measure, information capable of specifying a pressure or a flow rate of liquid in the liquid channel after a pressure difference is formed; and determines deterioration of the remover based on an acquired content.

15 Claims, 6 Drawing Sheets

DROPLET EJECTING APPARATUS, REMOVER DETERIORATION DETERMINING METHOD FOR DROPLET EJECTING APPARATUS, AND STORAGE MEDIUM

CROSS-REFERENCE TO RELATED APPLICATIONS

The entire disclosure of Japanese Patent Application No. 2023-078953, filed on May 12, 2023, including description, claims, drawings and abstract is incorporated herein by reference.

BACKGROUND OF THE INVENTION

Technical Field

The present invention relates to a droplet ejecting apparatus, a remover deterioration determining method for a droplet ejecting apparatus, and a storage medium.

Description of Related Art

Conventionally, there has been known a droplet ejecting apparatus which ejects droplets from a droplet ejecting section onto a recording surface of a recording medium to record an image. The droplet ejecting apparatus includes a tank containing liquid. The droplet ejecting apparatus feeds the liquid in the tank to the droplet ejecting section by the liquid feed pump.

The droplet ejecting apparatus is provided with, between the tank and the droplet ejecting section, a removal member such as a filter that removes a foreign substance in the liquid and a deaeration module that removes a gas in the liquid. In a case where the removal member is deteriorated and clogging occurs, the efficiency of foreign substance removal decreases. Therefore, the removal member needs to be appropriately replaced in accordance with its degree of deterioration.

In this connection, Japanese Unexamined Patent Publication No. 2003-011380 discloses an invention in which a foreign substance removal capability of a filter is detected by measuring a flow rate of ink in a channel.

SUMMARY OF THE INVENTION

However, in the invention described in Japanese Unexamined Patent Publication No. 2003-011380, the pump that feeds ink and the filter are provided in the same channel. For this reason, it is not possible to determine whether the cause of the decrease in the ink flow rate is deterioration of the pump or deterioration of the foreign substance removal capability of the filter.

The present invention has been made in view of such circumstances. An object of the present invention is to provide a droplet ejecting apparatus capable of accurately determining the cause of deterioration of a removal member, a method for determining deterioration of a removal member of a droplet ejecting apparatus, and a storage medium.

To achieve at least one of the abovementioned objects, according to an aspect of the present invention, there is provided a droplet ejecting apparatus including: a liquid feed pump that is provided in a liquid channel between a liquid storage to store liquid and a droplet ejector to eject liquid, and feeds out the liquid in the liquid storage to the droplet ejector; a remover that is located in the liquid channel and removes a foreign substance in liquid; and a hardware processor that: sets, using a pressure generator, a pressure on an upstream side in a liquid feeding direction of the remover to be higher than a pressure on a downstream side in the liquid feeding direction; acquires, from a measure, information capable of specifying a pressure or a flow rate of liquid in the liquid channel after a pressure difference is formed; and determines deterioration of the remover based on an acquired content.

To achieve at least one of the abovementioned objects, according to an aspect of the present invention, a method of determining deterioration of removal member of droplet ejecting apparatus is a remover deterioration determining method for a droplet ejecting apparatus including: a liquid feed pump that is provided in a liquid channel between a liquid storage to store liquid and a droplet ejector to eject liquid, and feeds out the liquid in the liquid storage to the droplet ejector; and a remover that is located in the liquid channel and removes a foreign substance in liquid, the method including: setting, using a pressure generator, a pressure on an upstream side in a liquid feeding direction of the remover to be higher than a pressure on a downstream side in the liquid feeding direction; acquiring, from a measure, information capable of specifying a pressure or a flow rate of liquid in the liquid channel after a pressure difference is formed; and determining deterioration of the remover based on an acquired content.

To achieve at least one of the abovementioned objects, according to an aspect of the present invention, a storage medium reflecting one aspect of the present invention is a non-transitory storage medium storing a computer readable program for a computer in a droplet ejecting apparatus including: a liquid feed pump that is provided in a liquid channel between a liquid storage to store liquid and a droplet ejector to eject liquid, and feeds out the liquid in the liquid storage to the droplet ejector; and a remover that is located in the liquid channel and removes a foreign substance in liquid, the program causing the computer to perform: setting, using a pressure generator, a pressure on an upstream side in a liquid feeding direction of the remover to be higher than a pressure on a downstream side in the liquid feeding direction; acquiring, from a measure, information capable of specifying a pressure or a flow rate of liquid in the liquid channel after a pressure difference is formed; and determining deterioration of the remover based on an acquired content.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
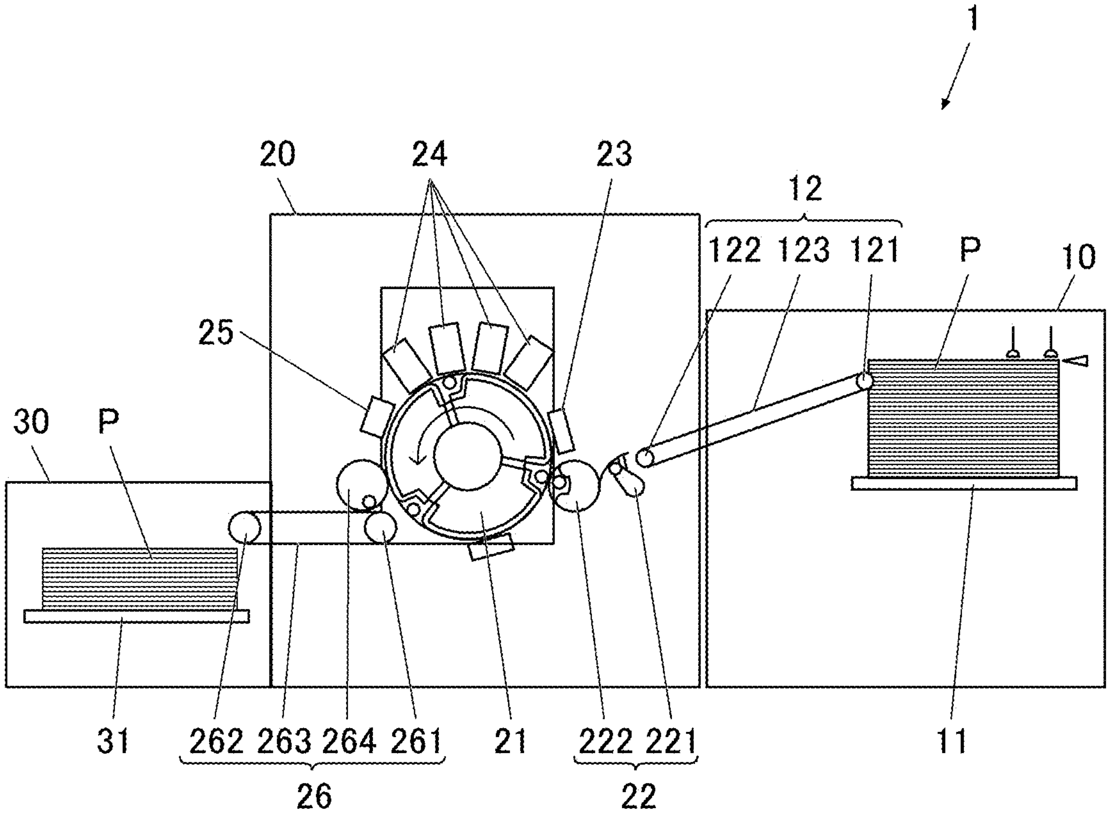
FIG. 1 is a side view of the inkjet recording apparatus.

Hereinafter, one or more embodiments of the present invention will be described with reference to the drawings. However, the scope of the invention is not limited to the disclosed embodiments. In the following description, components having the same functions and configurations are denoted by the same reference numerals, and redundant description thereof will be omitted.

[Overall Configuration of Inkjet Recording Apparatus]

Figure 2:
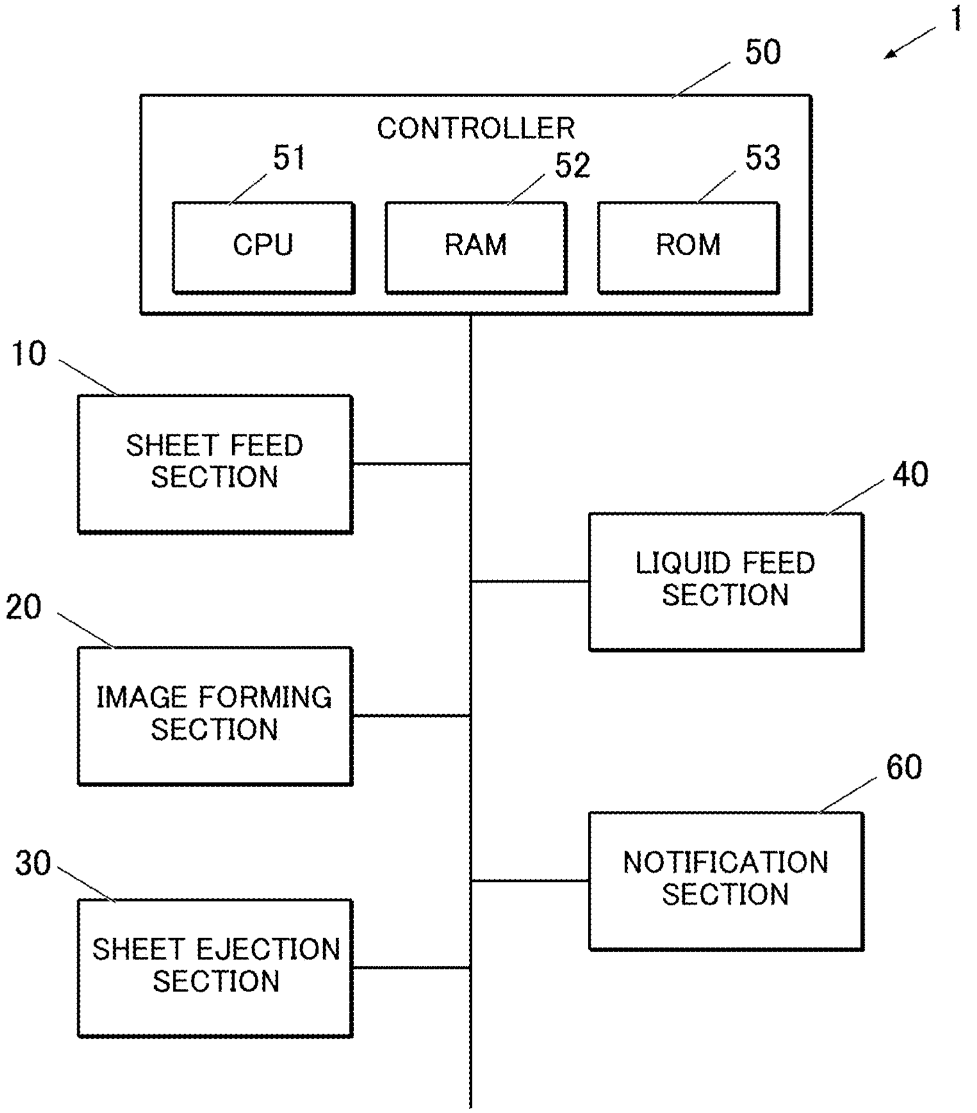
FIG. 2 is a block diagram illustrating a functional configuration of the inkjet recording apparatus.

FIG. 1 is a side cross-sectional view illustrating a main configuration of an inkjet recording apparatus 1 which is an embodiment of a droplet ejecting apparatus of the invention. FIG. 2 is a block diagram illustrating the functional configuration of the inkjet recording apparatus 1. The inkjet recording apparatus 1 includes a sheet feed section 10, an image forming section 20, a sheet ejection section 30, a liquid feed section 40, a controller 50 (hardware processor), and a notification section (notifier) 60.

(Sheet Feed Section)

The sheet feed section 10 stores the recording medium P before image formation. The sheet feed section 10 conveys the recording medium P to the image forming section 20 under the control of the controller 50. The sheet feed section 10 includes a sheet feed tray 11 and a conveyance section 12.

{Sheet Feed Tray}

The sheet feed tray 11 is a plate member that stores recording media P. One or a plurality of recording media P can be placed on the sheet feed tray 11. The sheet feed tray 11 moves up and down according to the amount of the recording media P placed thereon. The uppermost recording medium P is held at a position to be conveyed by the conveyance section 12, by the vertical movement of the sheet feed tray 11.

{Conveyance Section}

The conveyance section 12 conveys the recording medium P from the sheet feed tray 11 to the image forming section 20. The conveyance section 12 includes a conveyance mechanism. The conveyance mechanism drives the belt 123 to convey the recording medium P on the belt 123. The belt 123 has a loop shape. The inside of the loop of belt 123 is carried by a plurality of rollers 121, 122.

The conveyance section 12 includes a supply section. The supply section delivers the uppermost recording medium P placed on the sheet feed tray 11 onto the belt 123. The conveyance section 12 conveys the recording medium P along a belt 123 by the supply section.

(Image Forming Section)

The image forming section 20 cooperates with the liquid feed section 40 to perform a recording operation on the recording medium P under the control of the controller 50. The image forming section 20 includes an image forming drum 21, a handover unit 22, a sheet heating section 23, head units 24, an irradiation section 25, and a delivery section 26.

{Image Forming Drum}

The image forming drum 21 carries the recording medium P along its cylindrical outer peripheral surface. The image forming drum 21 conveys the recording medium P as it rotates. The conveyance surface of the image forming drum 21 faces the sheet heating section 23, the head units 24, and the irradiation section 25. The sheet heating section 23, the head units 24, and the irradiation section 25 perform image formation processing on the recording medium P borne and conveyed on the conveyance surface of the image forming drum 21.

{Handover Unit}

The handover unit 22 is provided at a position interposed between the conveyance section 12 and the image forming drum 21. The handover unit 22 includes a claw section 221 and a handover drum 222.

The claw section 221 is a cylindrical member that holds one end of the recording medium P conveyed by the conveyance section 12. The handover drum 222 is a member that guides the recording medium P borne on the claw section 221.

The handover unit 22 picks up the recording medium P on the conveyance section 12 with the claw section 221 and places the recording medium P along the outer peripheral surface of the handover drum 222. The handover unit 22 hands over the recording medium P to the image forming drum 21 by the above-described operation.

{Sheet Heating Section}

The sheet heating section 23 includes, for example, a heating wire or the like, and generates heat according to energization. The sheet heating section 23 generates heat so that the recording medium P passing through the vicinity thereof reaches a predetermined temperature. The sheet heating section 23 is provided so as to be located in the vicinity of the outer peripheral surface of the image forming drum 21 and on the upstream side in the conveyance direction of the recording medium P with respect to the head units 24.

A temperature sensor (not illustrated) is provided in the vicinity of the sheet heating section 23. The controller 50 detects the temperature in the vicinity of the sheet heating section 23 with the temperature sensor. The controller 50 controls heat generation of the sheet heating section 23 based on the detected temperature.

{Head Unit}

The head units 24 each eject ink droplets onto the recording medium P to form an image. The plurality of head units 24 corresponding to the respective colors of cyan (C), magenta (M), yellow (Y), and black (K) are provided. In FIG. 1, the head units 24 of the respective colors of Y, M, C, and K are provided in order from the upstream side with respect to the conveyance direction of the recording medium P.

A direction perpendicular to the conveyance direction in plan view is defined as a width direction. A plurality of head units 24 of the embodiment are provided so as to be arranged with a length (width) covering the entire recording medium P in the width direction. In addition, the head unit 24 of the embodiment is configured by arranging a plurality of inkjet heads **24*a* (refer to FIG. 3) which are droplet ejecting sections (droplet ejectors). That is, the inkjet recording apparatus 1** is, for example, a one pass line-head-type inkjet recording apparatus.

The number of head units 24 provided in the image forming section 20 may be three or less or five or more. Alternatively, a single inkjet head **24*a* may constitute the head unit 24**.

The ink ejected by the head units 24 is, for example, ultraviolet curable ink. The ultraviolet curable ink is a gel-like ink that undergoes a phase change between a gel state and a liquid (sol) state according to the temperature in a state in which ultraviolet rays are not irradiated from the irradiation section 25. The ultraviolet curable ink has a phase change temperature of, for example, about 40 to 100° C., and is uniformly liquefied (solated) by being heated to the phase change temperature or higher. On the other hand, the ultraviolet curable ink is gelled at about normal room temperature, that is, at about 0 to 30° C.

{Irradiation Section}

The irradiation section 25 includes, for example, a fluorescent tube such as a low-pressure mercury lamp. The irradiation section 25 emits energy rays such as ultraviolet rays by light emission of the fluorescent tube. The irradiation section 25 is provided in the vicinity of the outer peripheral surface of the image forming drum 21. Furthermore, the irradiation section 25 is provided so as to be located on the downstream side of the head unit 24 in the conveyance direction. The irradiation section 25 irradiates the recording medium P, on which ink has been ejected, with energy rays. The ink on the recording medium P is cured by action of the energy rays.

Note that the fluorescent tube that emits ultraviolet rays is not limited to the low-pressure mercury lamp. The fluorescent tubes may be mercury lamps with operating pressures of the order of a few hundred Pa to 1 MPa, for example. Further, the fluorescent tube may be a light source that can be used as a germicidal lamp. Examples of light sources that can be used as the bactericidal lamp include a cold-cathode tube, an ultraviolet laser light source, a metal halide lamp, and a light-emitting diode. Of these, for example, light-emitting diodes are more preferable for fluorescent tubes that are capable of emitting ultraviolet rays with higher illuminance and that are power-saving light sources. The energy ray is not limited to the ultraviolet ray, and may be an energy ray having a property of curing the ink in accordance with the property of the ink. Then, the light source is also replaced in accordance with the energy rays.

In the above description, the case where the head unit 24 discharges the ultraviolet curable ink has been exemplified, but the invention is not limited thereto. The ink ejected by the head unit 24 may be water-based ink or ink having other physical properties.

{Delivery Section}

The delivery section 26 includes a conveyance mechanism. The conveyance mechanism conveys the recording medium P by driving a ring-shaped belt 263 whose inner side is borne by a plurality of rollers 261 and 262. The delivery section 26 includes a cylindrical handover roller 14. The handover roller 264 hands over the recording medium P from the image forming drum 21 to the conveyance mechanism. The delivery section 26 conveys the recording medium P handovered onto the belt 13 by the handover roller 14 and sends it to the sheet ejection section 30.

(Sheet Ejection Section)

The recording medium P on which an image has been formed by the image forming section 20 is ejected to the sheet ejection section 30. The sheet ejection section 30 includes a sheet ejection tray 31 having a plate shape. The recording medium P sent from the image forming section 20 by the delivery section 26 is placed on the sheet ejection tray 31. The sheet ejection section 30 stores the recording medium P until a user takes out the recording medium P.

(Liquid Feed Section)

Figure 3:
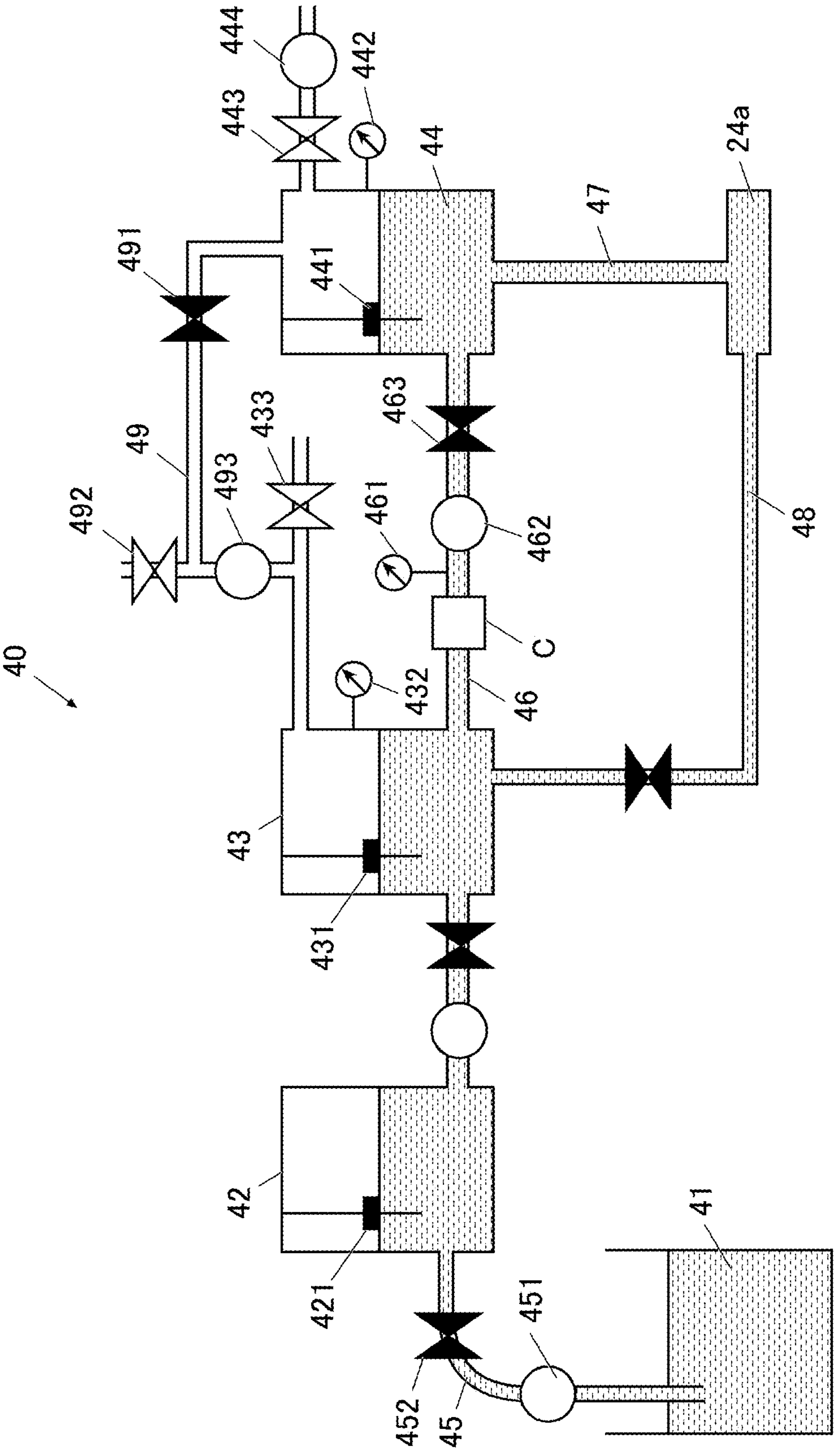
FIG. 3 is a schematic configuration diagram of a liquid feed section.

FIG. 3 shows a schematic configuration diagram of the liquid feed section 40. The liquid feed section 40 is capable of supplying an ink of each color to each head unit 24 to eject the ink of each color. The liquid feed section 40 includes a main tank 41 which is a liquid storage section, a heating tank 42, a first sub-tank 43, a second sub-tank 44, and the like.

<Main Tank>

The main tank 41 stores ink to be supplied to each part of the liquid feed section 40. The main tank 41 is, for example, a rigid sealed tank made of metal. The main tank 41 communicates with the heating tank 42 via the supply tube 45. The supply tube 45 is provided with a supply pump 451 and a supply valve 452.

<Supply Pump, Supply Valve>

The supply pump 451 and the supply valve 452 operate under the control of the controller 50. The ink in the main tank 41 is supplied to the heating tank 42 via the supply tube 45 by the driving of the supply pump 451 when the supply valve 452 is opened. Note that the entire main tank 41 is replaceable. The main tank 41 is formed so as to be detachable from the supply tube 45 regardless of a driving status of the supply pump 451.

<Heating Tank>

The heating tank 42 heats the ink supplied from the main tank 41. The heating tank 42 is provided with an ink heating section (not illustrated) that heats the ink therein to an appropriate temperature. A first float sensor 421 is also disposed in the heating tank 42.

The ink heating section is formed with a heater, a heat transfer member to transfer heat from the heater, and the like. As the heater forming the ink heating section, for example, a heating wire that generates Joule heat when energized is used. As the heat transfer member constituting the ink heating section, a member having high thermal conductivity is used. For example, a thermally conductive plate made of any of various metals (alloys) is used as the heat transfer member.

The first float sensor 421 acquires the liquid level height in the heating tank 42 and transmits the data to the controller 50. A liquid level height related to a lower limit amount of ink in the heating tank 42 is stored in a below-described ROM53 of the controller 50. Then, the controller 50 compares the transmission data of the first float sensor 421 with the liquid level height related to the lower limit amount of ink. In a case where the transmission data of the first float sensor 421 is lower than the liquid level height related to the lower limit amount of the ink, the controller 50 feeds out the ink from the main tank 41 which is the liquid storage section on the upstream side in the liquid feeding direction. On the other hand, in a case where the transmission data of the first float sensor 421 is higher than the liquid level height related to the upper limit amount of ink, the controller 50 causes the notification section 60 to display an error. By the control of the controller 50, the ink of the lower limit amount or more and the upper limit amount or less is always stored in the heating tank 42.

The heating tank 42 communicates with the first sub-tank 43 through a channel having a predetermined electromagnetic valve and a pump. The heating tank 42 selectively supplies the ink therein to the first sub-tank 43.

<First Sub-Tank>

The first sub-tank 43 is an upstream liquid storage section (upstream liquid storage storage) provided on the upstream side of a removal member C (remover), which will be described later, in the liquid feeding direction. The first sub-tank 43 is one or a plurality of ink chambers having a smaller volume than the main tank 41. The first sub-tank 43 stores the ink heated by the heating tank 42 while keeping the ink warm. The first sub-tank 43 is provided with a second float sensor 431, a first pressure gauge 432, a first atmosphere opening valve 433, and the like.

<Second Float Sensor>

The second float sensor 431 has substantially the same configuration as the first float sensor 421. That is, the second float sensor 431 acquires the liquid level height in the first sub-tank 43 and transmits the data to the controller 50. Then, the controller 50 sets the amount of ink in the first sub-tank 43 to be equal to or more than the lower limit amount and equal to or less than the upper limit amount based on the data.

<First Pressure Gauge>

The first pressure gauge 432 acquires a pressure value in the first sub-tank 43 and transmits the data to the controller 50.

<First Atmosphere Opening Valve>

The first atmosphere opening valve 433 is an electromagnetic valve controlled by the controller 50. Under the control of the controller 50, the first atmosphere opening valve 433 selectively opens or closes the first sub-tank 43 to the atmosphere.

<Ink Heat Retaining Section>

The ink heat retaining section (not shown) retains the ink in the first sub-tank 43 at an appropriate temperature. The ink heat retaining section has substantially the same configuration as the ink heating section, and therefore, detailed description thereof is omitted.

The first sub-tank 43 is in communication with an outlet of the inkjet head 24*a* via a collection path 48. The ink that is not ejected from the inkjet head 24*a* passes through the collection path 48 and is collected in the first sub-tank 43. With this configuration, ink can be collected without waste even in a case where ink needs to be removed, for example, for maintenance of the inkjet head 24*a*.

The first sub-tank 43 communicates with the second sub-tank 44 via a liquid feed pipe 46 which is a first channel. The liquid feed pipe 46 is provided with a removal member C, a channel pressure gauge 461, a liquid feed pump 462, a liquid feed valve 463, and the like.

<Removal Member>

The removal member C removes foreign substance in the ink. In the present embodiment, the removal member C is, for example, a filter having a mesh with a predetermined size. The removal member C is formed of, for example, a mesh-like metal or resin porous body. The foreign substance to be removed by the removal member C is, for example, dust, iron powder, or an aggregate of pigment.

<Channel Pressure Gauge>

The channel pressure gauge 461 acquires a pressure value in the liquid feed pipe 46 and transmits the data to the controller 50.

<Liquid Feed Pump>

The liquid feed pump 462 feeds the ink in the first sub-tank 43 to the second sub-tank 44. In the present invention, the liquid feed pump 462 is a diaphragm pump including a check valve and a diaphragm. When the liquid feed pump 462 is a diaphragm pump, a risk that a foreign substance is mixed in the ink and a risk that liquid leakage occurs are reduced.

<Liquid Feed Valve>

The liquid feed valve 463 is an electromagnetic valve controlled by the controller 50. Under the control of the controller 50, the liquid feed valve 463 selectively opens and closes the liquid feed pipe 46 when the liquid feed pump 462 is driven.

<Second Sub-Tank>

The second sub-tank 44 is a downstream liquid storage section (downstream liquid storage) provided on the downstream side of the removal member C in the liquid feeding direction. The second sub-tank 44 is a small tank chamber in which the ink fed from the first sub-tank 43 is temporarily stored. The capacity of the second sub-tank 44 is not particularly limited, but is substantially the same as the capacity of the first sub-tank 43. The second sub-tank 44 communicates with the inlet of each inkjet head 24*a* via a supply path 47. Each ink-jet head 24*a* is supplied with ink from the second sub-tank 44 in accordance with the amount of ink to be ejected. The second sub-tank 44 is provided with a third float sensor 441, a second pressure gauge 442, a back pressure valve 443, a back pressure pump 444, and the like.

<Third Float Sensor>

The third float sensor 441 measures the liquid level height in the second sub-tank 44 and transmits the data to the controller 50. The controller 50 adjusts, based on the measurement data, the amount of ink in the second sub-tank 44 to be equal to or more than the lower limit amount and equal to or less than the upper limit amount, similarly to the heating tank 42 and the first sub-tank 43. In addition, the controller 50 determines the deterioration of the removal member C based on the measurement data of the third float sensor 441 which is a measurement section (measure) in a removal member deterioration determination processing which will be described later.

Figure 4:
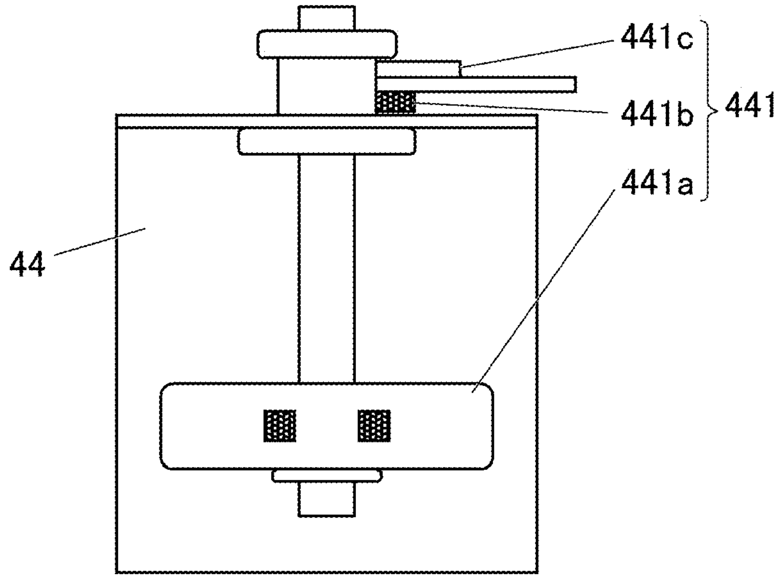
FIG. 4 is a schematic cross-sectional view of the second float sensor and the second sub-tank.

A detailed configuration of the third float sensor 441 in the present embodiment is shown in FIG. 4. As illustrated in FIG. 4, the third float sensor 441 includes a float 441*a* provided in the second sub-tank and a magnetic sensor 441*b* provided at an upper portion of the second sub-tank 44. A magnetic material 441*c* is provided in the vicinity of the magnetic sensor 441*b*.

Magnets are built in the float 441*a*. The float 441*a* moves up and down in accordance with the increase and decrease of the ink in the second sub-tank 44 to generate a magnetic field. The magnetic sensor 441*b* measures a liquid level height in the second sub-tank 44 by a magnetic-flux density of a magnetic field that changes in accordance with rising and falling of the float 441*a*. The magnetic body 441*c* concentrates magnetic flux on the magnetic sensor 441*b*, thereby improving the sensitivity of the magnetic sensor 441*b*.

<Second Pressure Gauge>

Returning to FIG. 3, the second pressure gauge 442 acquires the pressure value in the second sub-tank 44 and transmits the data to the controller 50.

<Back Pressure Valve and Back Pressure Pump>

The back pressure valve 443 selectively opens and closes in response to driving of the back pressure pump 444 under the control of the controller 50. The back pressure pump 444 applies an appropriate negative pressure to the inkjet head 24*a* by adjusting the value of the pressure in the second sub-tank 44 under the control of the controller 50. The negative pressure suppresses leakage of ink from the inkjet head 24*a* at timings except for timings of image formation and various kinds of maintenance.

<Air Supply Pipe>

Further, the first sub-tank 43 and the second sub-tank 44 communicate with each other through an air supply pipe 49. The air supply pipe 49 is provided with a second atmosphere opening valve 491, a pressure regulating valve 492, and an air pressure pump 493. The air pressure pump 493 depressurizes the inside of the first sub-tank 43 by sucking the air in the first sub-tank 43. When only the second atmosphere opening valve 491 is in the open state, the air is supplied into the second sub-tank 44 to pressurize the inside of the second sub-tank 44. Alternatively, when the pressure regulating valve 492 is in an open state, the air is released into the atmosphere. In addition, when the second atmosphere opening valve 491 is in a closed state, the air pressure pump 493 pressurizes the inside of the first sub-tank 43 by sending the atmosphere into the first sub-tank 43.

(Controller)

Returning to FIG. 2, the controller 50 controls each part constituting the inkjet recording apparatus 1. The controller 50 is connected to each of the units constituting the inkjet recording apparatus 1. The controller 50 includes a central processing unit (CPU) 51, a random access memory (RAM) 52, a read only memory (ROM) 53, and the like.

The CPU51 reads various programs and date corresponding to processing contents from the storage device of the ROM53 or the like and executes them. In addition, the CPU51 controls the operation of each unit of the inkjet recording apparatus 1 according to the executed processing content. The RAM52 temporarily stores therein various programs and date processed by the CPU51. The ROM53 stores various programs and date read by the CPU51 or the like.

(Notification Section)

The notification section 60 provides notification of various types of information under the control of the controller 50. The notification section 60 is, for example, a display part having a screen or a communication section capable of communicating with other devices via a network.

[Removal Member Deterioration Determination Processing]

Removal member deterioration determination processing in the inkjet recording apparatus 1 configured as described above will be described. The removal member deterioration determination processing is executed at a predetermined timing, for example, before shutdown of the inkjet recording apparatus 1 at the end of printing.

Figure 5:
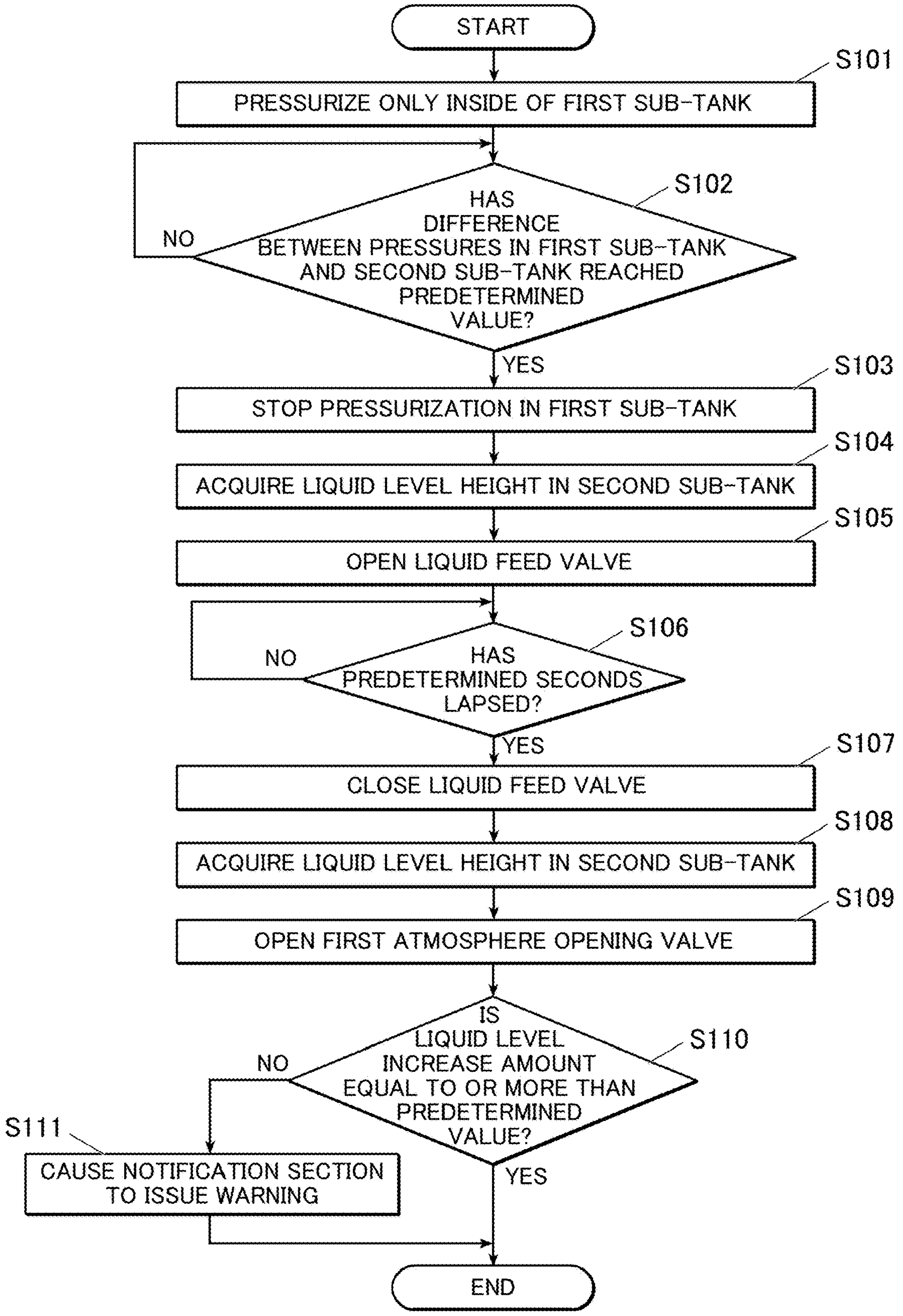
FIG. 5 is a flowchart of removal member deterioration determination processing.

FIG. 5 is a flowchart illustrating an example of removal member deterioration determination processing. In the present processing, the controller 50 functions as a determination section for determining the deterioration of the removal member C.

First, the controller 50 closes the first atmosphere opening valve 433 and the second atmosphere opening valve 491. Next, the controller 50 opens the pressure adjustment valve 492 and then drives the air pressure pump 493. By the control, the controller 50 pressurizes only the inside of the first sub-tank 43 (step S101). The controller 50 waits until the difference between the pressures in the first sub-tank 43 and the second sub-tank 44 reaches a predetermined value (for example, 30 kPa) (step S102).

When the difference between the pressures in the first sub-tank 43 and the second sub-tank 44 reaches the predetermined value (step S102; Yes), the controller 50 stops the pressurization in the first sub-tank 43 (step S103). That is, the controller 50 stops driving the air pressure pump 493. In this way, the controller 50 controls the driving of the pressure generating section (pressure generator) such as the air pressure pump 493. The controller 50 functions as a pressure difference forming section that controls the driving of the pressure generating section to make the pressure in the first sub-tank 43 relatively higher than the pressure in the second sub-tank 44.

After the pressurization of the first sub-tank 43, the controller 50 acquires the liquid level height in the second sub-tank 44 by the third float sensor 441 (step S104).

The controller 50 opens the liquid feed valve 463 (step S105). As described above, the pressure in the first sub-tank 43 is relatively higher than the pressure in the second sub-tank 44. Therefore, due to the pressure difference, the ink in the first sub-tank 43 passes through the liquid feed tube 46 and flows into the second sub-tank 44 even when the liquid feed pump 462 is not operating.

The controller 50 opens the liquid feed valve 463 for predetermined seconds (step S106). After a lapse of predetermined seconds (step S106; Yes), the controller 50 closes the liquid feed valve 463 (step S107). Then, the controller 50 acquires the liquid level height in the second sub-tank 44 again by the third float sensor 441 (step S108). After acquiring the liquid level height in the second sub-tank 1, the controller 50 opens the first atmosphere opening valve 433 to open the first sub-tank 43 to the atmosphere (step S109).

The controller 50 compares the liquid level heights in the second sub-tank 44 acquired in steps S104 and S108, and calculates the liquid level increase amount, that is, the flow rate of the ink. In this manner, the controller 50 functions as an acquisition section which acquires information capable of specifying the flow rate of the liquid in the liquid feed pipe 46 after the pressure difference is formed from the third float sensor 441 which is a measurement section. The controller 50 determines whether or not the liquid level increase amount is equal to or more than a predetermined value (e.g., 3 mm) (step S110).

As described above, in step S105, the ink in the first sub-tank 43 flows into the second sub-tank 44 via the removal member C. Therefore, in a case where the liquid level increase amount is less than the predetermined value (step S110; No), it is considered that the removal member C is deteriorated and clogging occurs in the removal member C. At this time, the controller 50 causes the notification section 60 to issue a warning (step S111). Specifically, the controller 50 prompts replacement of the removal member C. A target to which the warning is notified by the notification section 60 may be a user who uses the inkjet recording apparatus 1 or a service engineer who manages the inkjet recording apparatus 1.

After the notification of the warning by the notification section 1, the controller 50 ends this process.

On the other hand, when the liquid level increase amount in the second sub-tank 44 is equal to or more than the predetermined value (step S110; Yes), the removal member C is not deteriorated, and clogging does not occur. Therefore, the controller 50 ends this process without causing the notification section 60 to issue a warning.

Effects of Embodiment

As described above, the inkjet recording apparatus 1 according to the present embodiment includes the air pressure pump 493 that makes the pressure on the upstream side of the liquid feeding direction of the removal member C relatively higher than the pressure on the downstream side of the liquid feeding direction. In addition, the inkjet recording apparatus 1 acquires information capable of specifying the flow rate of the ink in the liquid feed pipe 46 after the air pressure pump 493 forms the pressure difference from the third float sensor 441. In addition, the inkjet recording apparatus 1 determines the deterioration of the removal member C based on the information acquired from the third float sensor 441. According to the above configuration, the deterioration of the removal member C is determined after the liquid is fed not by the liquid feed pump 462 but by the air pressure pump 493. Therefore, the deterioration of the removal member C can be accurately determined.

In addition, the liquid feed pump 462 of the inkjet recording apparatus 1 according to the embodiment is a diaphragm pump. When a foreign substance adheres to the check valve of the diaphragm pump, the liquid feed amount decreases. Therefore, in the conventional invention, only the liquid feed amount was acquired, and it was not possible to determine whether the cause was deterioration of the removal member C or deterioration of the liquid feed pump 462. However, in the present invention, since the liquid feed amount is acquired after the liquid is fed without depending on the liquid feed pump 462, it is possible to accurately determine the deterioration of the removal member C.

Furthermore, the inkjet recording apparatus 1 according to the present embodiment includes a float 441*a* that generates a magnetic field in response to the rise and fall of the liquid level, and a magnetic sensor 441*b* that measures the flux density of the magnetic field. According to the above configuration, the magnetic sensor 441*b* can acquire the liquid level height without contacting the ink.

A magnetic body 441*c* is provided in the vicinity of the magnetic sensor 441*b*. According to the configuration, the magnetic flux concentrates on the magnetic sensor 441*b*. As a result, the sensitivity of the magnetic sensor 441*b* is improved, and the liquid level height can be acquired more accurately.

[Other Configurations]

Although specific description has been given above based on the embodiment according to the present invention, the present invention is not limited to the above-described embodiment. It is a matter of course that the present invention can be subjected to various modifications including the scope of the invention described in the scope of the claims and the scope of equivalents thereof.

For example, in the above description, a case where the removal member C is a filter has been exemplified, but the present invention is not limited thereto. The removal member C may be a deaeration module including a gas permeable membrane such as a hollow fiber therein. In this case, the foreign substance in the ink removed by the removal member C is air.

Further, in the above description, the configuration in which the flow rate of the ink is acquired based on the change in the liquid level height in the second sub-tank 44 in the removal member deterioration determination processing has been exemplified, but the invention is not limited thereto. For example, known flow meters may be provided as measurement sections on the upstream side and the downstream side of the removal member C in the liquid feed direction, respectively. Then, the flow rate of ink may be acquired based on a difference between measurement values of both of the flow meters.

However, the flowmeter requires a space for installation. In addition, it is necessary to adopt a flowmeter having heat resistance and ink resistance. Therefore, the cost is high. Therefore, the above-described configuration in which the change in the liquid level height in the second sub-tank 44 is acquired is more preferable.

Furthermore, for example, the channel pressure gauge 461 may be used as the measurement section to determine the deterioration of the removal member C on the basis of the difference in pressure value between before and after the opening of the liquid feed valve 463.

As described above, when the removal member C is not deteriorated and there is no clogging, the ink in the first sub-tank 43 flows to the second sub-tank 44 via the removal member C. Therefore, the pressure difference between the inside of the first sub-tank 43 and the inside of the second sub-tank 44 is reduced. That is, the pressure difference in the flow channel pressure gauge 461 before and after the opening of the liquid feed valve 463 becomes small. On the other hand, when the removal member C is deteriorated and clogged, the ink in the first sub-tank 43 does not easily flow into the second sub-tank 44. Therefore, the pressure difference between the inside of the first sub-tank 43 and the inside of the second sub-tank 44 is hardly reduced. That is, the pressure difference in the channel pressure gauge 461 before and after the opening of the liquid feed valve 463 becomes large.

In addition, in the above description, a configuration in which the air pressure pump 493 is used as the pressure generating section and the pressure value in the first sub-tank 43 is set to be relatively higher than the pressure value in the second sub-tank 44 is exemplified, but the invention is not limited thereto. That is, the back pressure pump 444 may be used as the pressure generating section. In this case, the pressure value in the first sub-tank 43 is made relatively higher than the pressure value in the second sub-tank 44 by reducing the pressure in the second sub-tank 44.

However, if the amount of pressure reduction in the second sub-tank 44 is too large, air is drawn in from the 24*a* of the inkjet head, and meniscus-break occurs. Therefore, when the pressure in the second sub-tank 44 is reduced, the amount of pressure reduction is preferably about −1 kPa to −3 kPa.

Furthermore, the pressure generating section is not limited to only one of the air pressure pump 493 and the back pressure pump 444. That is, both the air pressure pump 493 and the back pressure pump 444 may be operated to make the pressure value in the first sub-tank 43 relatively higher than the pressure value in the second sub-tank 44.

Figure 6:
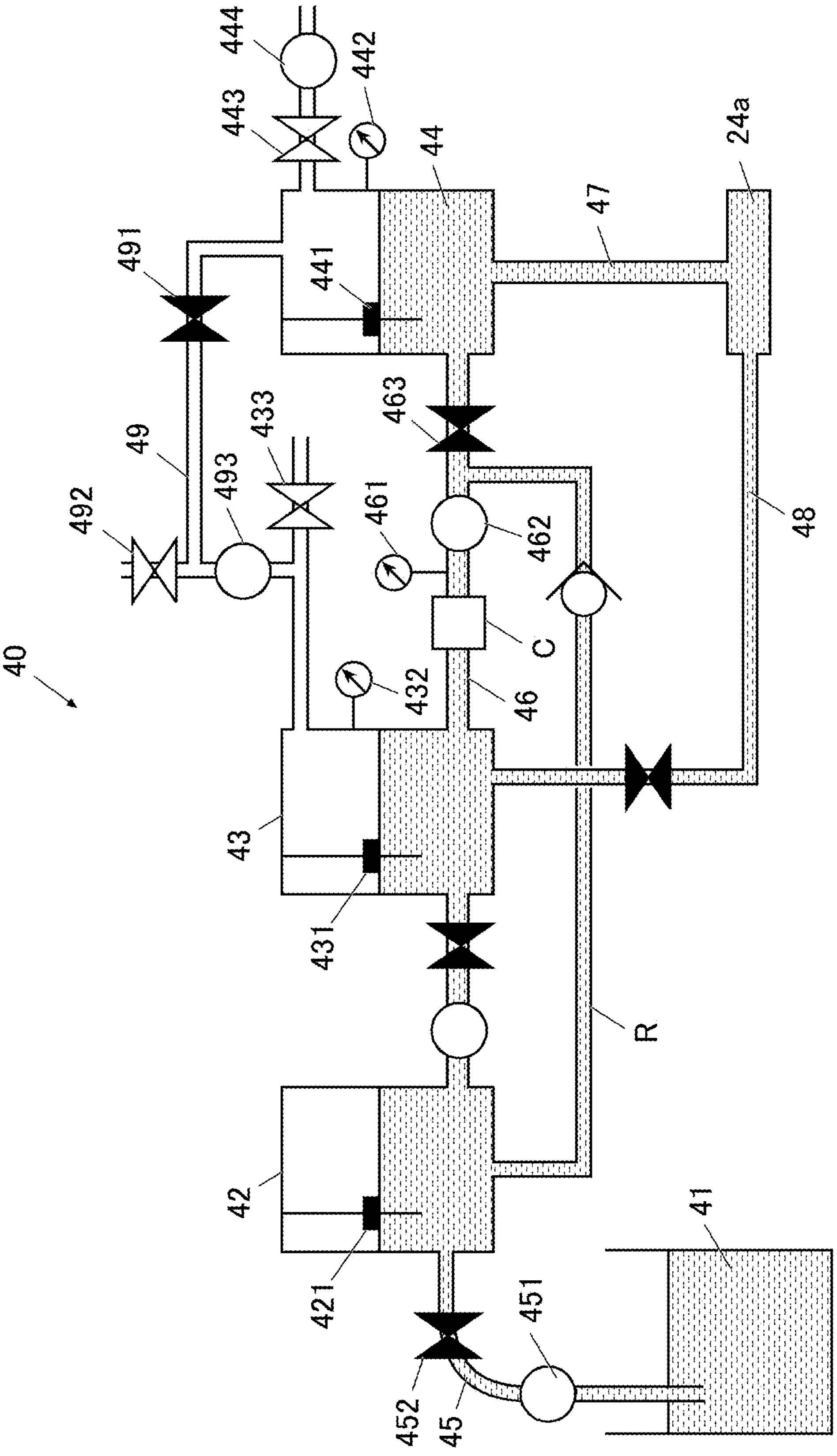
FIG. 6 is a schematic configuration diagram of a liquid feed section provided with a return channel returning from a liquid feed pipe to a heating tank.

In addition, as shown in FIG. 6, a return channel R which is a second channel communicating with the heating tank 42 may be provided to the liquid feed pipe 46. The return channel R is provided so as to branch from a position in the liquid feed pipe 46, on the downstream side of the removal member C and the liquid feed pump 462 in the liquid feed direction and on the upstream side of the liquid feed valve 463 in the liquid feed direction.

The return channel R is provided with a check valve. The controller 50 can return the ink in the first sub-tank 43 to the heating tank 42 by closing the liquid feed valve 463, opening the check valve, and feeding the liquid by the liquid feed pump 462. With the above-described configuration, in a case where the ink in the first sub-tank 43 is insufficiently heated or has temperature unevenness, the ink can be heated again by the heating tank 42.

Furthermore, in a case where the return channel R is provided in the liquid feed pipe 46, in the removal member deterioration determination processing, the deterioration of the removal member C may be determined by acquiring information with which the flow rate of the ink in the return channel R can be specified. In the aforementioned configuration, the first float sensor 421 is a measurement section. Furthermore, a pressure gauge may be provided as a measurement section in the return channel R, and the deterioration of the removal member C may be determined based on a difference between pressure values before and after the opening of the liquid feed valve 463.

In addition, in the above description, the configuration in which the deterioration of the removal member C is determined by acquiring the information capable of specifying the pressure or the flow rate of the ink after the first atmosphere opening valve 433 is opened is adopted, but the invention is not limited thereto. The timing at which the first atmosphere opening valve 433 is opened is arbitrary as long as it is after step S108, and is not particularly limited.

Furthermore, although the inkjet recording apparatus 1 that ejects ink has been given as an example of one embodiment of a droplet ejecting apparatus in the description above, it is not limited thereto. That is, the liquid to be degassed by the degassing apparatus 100 according to the present invention is not limited to ink, and may be, for example, a pretreatment agent, blood, water, or the like.

Furthermore, although an example in which a hard disk, a semiconductor nonvolatile memory, or the like is used as a computer-readable medium for the program according to the present invention has been disclosed above, the medium is not limited to this example. As another computer-readable medium, a portable storage medium such as a CD-ROM can be applied. A carrier wave is also applied as a medium for providing data of the program according to the present invention via a communication line.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-078953 filed on May 12, 2023 is incorporated herein by reference in its entirety.

What is claimed is:

1. A droplet ejecting apparatus comprising:

a liquid feed pump that is provided in a liquid channel between a liquid storage to store liquid and a droplet ejector to eject liquid, and feeds out the liquid in the liquid storage to the droplet ejector;

a remover that is located in the liquid channel and removes a foreign substance in liquid; and a hardware processor that:

sets, using a pressure generator, a pressure on an upstream side in a liquid feeding direction of the remover to be higher than a pressure on a downstream side in the liquid feeding direction to form a pressure difference in a state that the liquid channel is closed;

acquires, from a measure, information capable of specifying a pressure or a flow rate of liquid in the liquid channel when the liquid channel is opened after the pressure difference is formed; and determines deterioration of the remover based on the acquired information.

2. The droplet ejecting apparatus according to claim 1, wherein the pressure generator is a pump that adjusts a pressure value in the liquid storage.

3. The droplet ejecting apparatus according to claim 2, wherein the liquid storage includes an upstream liquid storage provided on the upstream side in the liquid feeding direction of the remover, and the pressure generator is an air pressure pump that pressurizes an inside of the upstream liquid storage.

4. The droplet ejecting apparatus according to claim 2, wherein the liquid storage includes a downstream liquid storage provided on the downstream side in the liquid feeding direction of the remover, and the pressure generator is a back pressure pump that depressurizes an inside of the downstream liquid storage.

5. The droplet ejecting apparatus according to claim 4, wherein the back pressure pump depressurizes a pressure value inside the downstream liquid storage to a value in a range from −1 kPa to −3 kPa.

6. The droplet ejecting apparatus according to claim 2, wherein the hardware processor acquires, from the measure, information capable of specifying a pressure or a flow rate of liquid in a second channel branched from a downstream side of the remover in a conveyance direction in a first channel, which is the liquid channel passing through the remover.

7. The droplet ejecting apparatus according to claim 1, wherein the liquid feed pump is a diaphragm pump.

8. The droplet ejecting apparatus according to claim 1, wherein the measure measures a change amount of a liquid level height of the liquid storage.

9. The droplet ejecting apparatus according to claim 8, wherein the measure includes a float that generates a magnetic field in response to rise and fall of a liquid level, and a magnetic sensor that measures a magnetic flux density of the magnetic field.

10. The droplet ejecting apparatus according to claim 9, wherein a magnetic body is provided in vicinity of the magnetic sensor.

11. The droplet ejecting apparatus according to claim 1, wherein the measure is a flowmeter.

12. The droplet ejecting apparatus according to claim 1, further comprising a notifier that is caused by the hardware processor to issue a warning in response to determination that the remover is deteriorated.

13. The droplet ejecting apparatus according to claim 1, wherein the liquid feed pump is provided in the liquid channel between the liquid storage, which is configured to receive liquid from a main tank, and a second liquid storage, which is configured to feed the liquid to the droplet ejector, and the remover is located in the liquid channel between the liquid storage and the second liquid storage.

14. A non-transitory storage medium storing a computer readable program for a computer in a droplet ejecting apparatus including: a liquid feed pump that is provided in a liquid channel between a liquid storage to store liquid and a droplet ejector to eject liquid, and feeds out the liquid in the liquid storage to the droplet ejector; and a remover that is located in the liquid channel and removes a foreign substance in liquid, the program causing the computer to perform:

setting, using a pressure generator, a pressure on an upstream side in a liquid feeding direction of the remover to be higher than a pressure on a downstream side in the liquid feeding direction to form a pressure difference in a state that the liquid channel is closed;

acquiring, from a measure, information capable of specifying a pressure or a flow rate of liquid in the liquid channel when the liquid channel is opened after the pressure difference is formed; and determining deterioration of the remover based on the acquired information.

15. A remover deterioration determining method for a droplet ejecting apparatus including: a liquid feed pump that is provided in a liquid channel between a liquid storage to store liquid and a droplet ejector to eject liquid, and feeds out the liquid in the liquid storage to the droplet ejector; and a remover that is located in the liquid channel and removes a foreign substance in liquid, the method comprising:

setting, using a pressure generator, a pressure on an upstream side in a liquid feeding direction of the remover to be higher than a pressure on a downstream side in the liquid feeding direction to form a pressure difference in a state that the liquid channel is closed;

acquiring, from a measure, information capable of specifying a pressure or a flow rate of liquid in the liquid channel when the liquid channel is opened after the pressure difference is formed; and determining deterioration of the remover based on the acquired information.

* * * * *